United States Patent
Guha

(10) Patent No.: US 6,898,315 B2
(45) Date of Patent: May 24, 2005

(54) FEATURE EXTRACTION FOR REAL-TIME PATTERN RECOGNITION USING SINGLE CURVE PER PATTERN ANALYSIS

(75) Inventor: Angshuman Guha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 10/104,453

(22) Filed: Mar. 22, 2002

(65) Prior Publication Data

US 2002/0097910 A1 Jul. 25, 2002

Related U.S. Application Data

(63) Continuation of application No. 09/046,218, filed on Mar. 23, 1998.

(51) Int. Cl.[7] .................................................. G06K 9/00
(52) U.S. Cl. ..................... 382/187; 382/198; 382/203; 382/241
(58) Field of Search ................................. 382/181, 187, 382/188, 189, 186, 182, 184, 241, 137, 195, 197, 198, 201, 203, 122, 123; 345/441

(56) References Cited

U.S. PATENT DOCUMENTS

| 5,105,468 | A | | 4/1992 | Guyon et al. |
| 5,333,209 | A | | 7/1994 | Sinden et al. |
| 5,454,046 | A | | 9/1995 | Carman, II |
| 5,588,073 | A | | 12/1996 | Lee et al. |
| 5,764,797 | A | * | 6/1998 | Adcock ....................... 382/187 |
| 5,768,417 | A | | 6/1998 | Errico et al. |
| 5,774,582 | A | | 6/1998 | Gat et al. |
| 5,848,187 | A | | 12/1998 | Bricklin et al. |
| 5,850,477 | A | * | 12/1998 | Takada ....................... 382/186 |
| 5,970,170 | A | | 10/1999 | Kadashevich et al. |

* cited by examiner

Primary Examiner—Thomas D. Lee
(74) Attorney, Agent, or Firm—Law Offices of Albert S. Michalik, PLLC

(57) ABSTRACT

A feature extractor samples points on an input pattern drawn in real time. In addition to X and Y coordinates, each sample has an up/down or Z coordinate value representing whether or not the sample point is a perceptible part of the pattern. The groups of coordinate values are transformed into respective sets of coefficients of Chebyshev polynomials by least-squares fit. A recognition unit can use the coefficients as features to identify the character. Additional features, such as aspect ratio and center of gravity, are also derived to aid in recognizing the pattern or reconstructing its image.

32 Claims, 7 Drawing Sheets

| RAW COORDINATES 310 | | |
|---|---|---|
| X | Y | Z |
| 0.135 | 0.901 | +1 |
| 0.135 | 0.135 | +1 |
| 0.139 | 0.878 | +1 |
| 0.141 | 0.865 | +1 |
| --- | --- | --- |
| 0.138 | 0.286 | +1 |
| 0.000 | 0.000 | −1 |
| 0.000 | 0.000 | −1 |
| --- | --- | --- |
| 0.000 | 0.000 | −1 |
| 0.512 | 0.877 | +1 |
| 0.514 | 0.872 | +1 |
| 0.515 | 0.864 | +1 |
| 0.000 | 0.000 | −1 |

311, 312

| FEATURE LIST 320 | | |
|---|---|---|
| X | Y | Z |
| $c_0$ −.055908 | −.223648 | +.495499 |
| $c_1$ +.613144 | +.397675 | −.066559 |
| $c_2$ −.254486 | −.614029 | +.633408 |
| $c_3$ +.064468 | +.033371 | +.005356 |
| $c_4$ +.480545 | −.487549 | +.124069 |
| $c_5$ +.144287 | +.396698 | +.329956 |
| $c_6$ −.137634 | +.418579 | −.488205 |
| $c_7$ −.145569 | −.333237 | −.537766 |
| $c_8$ −.092650 | −.261749 | |
| $c_9$ −.112823 | +.184143 | |

321

322
$Y_{top}$
$W$
$H$
$R$
$N$
$A_{TOTAL}$
$A_{MAX}$
$G_Y$

FIG. 3

FEATURE EXTRACTION FOR REAL-TIME PATTERN RECOGNITION USING SINGLE CURVE PER PATTERN ANALYSIS

CROSS-REFERENCE TO RELATED APPLICATION

This application is a continuation of copending U.S. patent application Ser. No. 09/046,218, filed Mar. 23, 1998.

BACKGROUND OF THE INVENTION

The present invention relates to electronic data processing, and more specifically concerns machine recognition of alphanumeric characters and similar patterns.

On-line, handprint recognition is the identification of alphanumeric characters as a user inputs to a computer, in real-time, usually with a pressure-sensitive touchpad or similar device. Character recognition of this type is becoming increasingly important in applications such as electronic pocket organizers and in-store customer-operated directories and catalogs.

On-line recognition typically captures a character in real time as it is entered, as a sequence of sampled points each having an X and a Y coordinate value. Few recognition hardware devices or software routines recognize characters directly from input samples or other direct data. Instead, they use various data-reduction techniques to reduce the typically thousands or tens of thousands of data bytes to a few hundred bytes representing typically one or several dozens of "features" representing the character. For example, the presence or absence of vertical and horizontal lines in several different regions of the character area might comprise a set of features. The presence of closed loops and open regions ("lakes and bays") in different character areas can constitute a feature set. More abstract features such as two-dimensional Fourier-transform or wavelet coefficients have been employed as features. The features extracted from a character are then input into a recognition device or routine for identification of the pattern as belonging to one of a number of predefined output classes such as letters of the Roman alphabet and West-Arabic numerals.

Conventional on-line recognition algorithms divide each input character into a number of strokes, as the user's finger, stylus, or other instrument contacts the pad, draws a straight or curved line, and then raises the writing instrument. The total character, or "ink", may contain from one to four or five strokes. Conventional on-line recognizers typically use the number of strokes as one of the primary features for recognizing the characters: a lower-case handprinted "c" generally has a single stroke, an uppercase "A" has three strokes . . . .

Or does it? An "A" may be drawn from upper center to lower left, then from upper center to lower right, then a crossbar from mid-left to right. Or it may be drawn with two strokes, as an inverted "V" followed by the crossbar. Or it may have only a single stroke, if the crossbar is drawn after the inverted "V" without lifting the stylus. Or it may have four or five strokes, if the stylus skips at one or more points during the input process.

Even when the stroke count can be dealt with by storing multiple variations of the same character, stroke-based recognizers have unavoidable difficulties. Previous recognizers have employed extra storage and recognition circuits for each variation, or special architectures such as time-delayed neural nets to accommodate variable-size inputs.

One way to avoid differing numbers of strokes is to require the user to write characters in a certain form. For example, a conventional pocket organizer requires each character to be entered as a single stroke in a "simplified" alphabet. However, even if such an alphabet is easy to learn, it does require some amount of practice, and it cannot be employed in an unconstrained setting such as an information display in a store.

Accordingly, there is a need for better on-line, real-time recognition of handprint characters and other patterns. Stroke-based methods have not been able to produce a simple, reliable, or inexpensive solution.

SUMMARY OF THE INVENTION

The present invention provides a novel method of representing on-line input characters for recognition or other purposes. The habit of dividing a character into multiple strokes derives from the static visible image of the character. However, when a user inputs a character directly into a computer in real time, a feature extractor can treat the entire character as a single continuous curve, as a series of X,Y coordinates of sample points. The pen-up portions of the curve, where the writing implement does not touch the input pad, can be interpolated from the pen-down points. Whether the pen is up or down is, of course, important; therefore, the invention adds a Z coordinate; each sample point has one value of this coordinate when the pen is down, and another value when it is up.

The three series of coordinate values—one for the X coordinate, one for the Y coordinate, and one for the binary-valued Z coordinate—are transformed into three strings of coefficients of a basis function such as a Chebyshev polynomial. The coefficients reduce the raw data of the original character to a much more manageable size, while preserving the information that is significant to its identity. Also, such coefficients can be easily manipulated to compensate for different sizes and orientations in the input character.

These coefficients, along with additional optional parameters derived from the input character, serve as features of the character. The features are then passed to a recognition unit for identifying the character, and may also be employed for reconstructing the character image and for other purposes.

Other advantages and features of the present invention will appear from the following detailed description; the scope of the invention, however, is to be measured only by the appended claims.

BRIEF DESCRIPTION OF THE DRAWING

FIG. 2, comprising

FIG. 3 shows a number of tables employed in the method of FIG. 2.

FIG. 4, comprising

DETAILED DESCRIPTION

Exemplary Operating Environment

Figure 1:
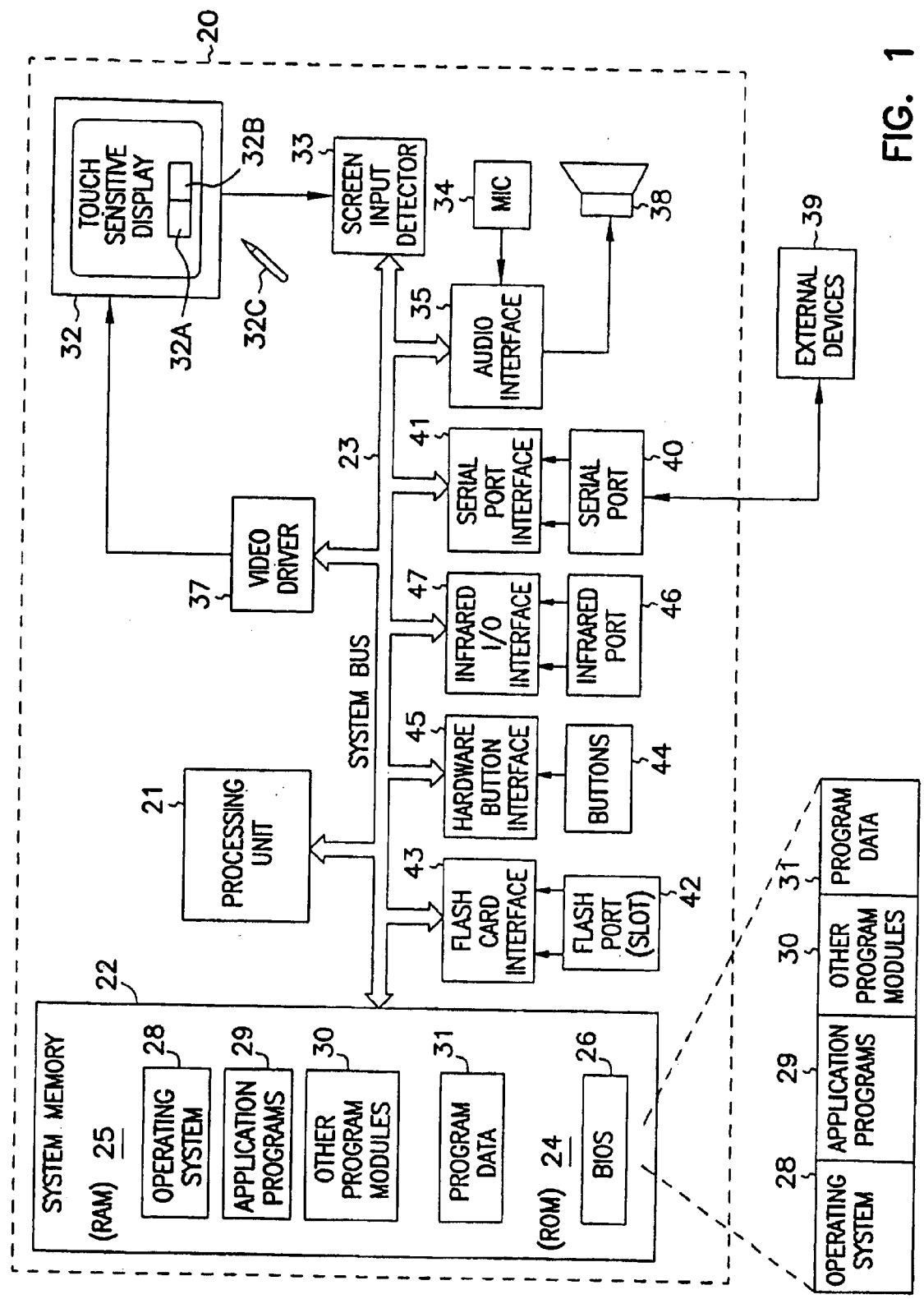
FIG. 1 is a block diagram of a computer serving as an environment for the present invention.

FIG. 1 and the following discussion provide a brief, general description of a suitable computing environment in which the invention may be practiced. Although not required, the invention will be described in the general context of computer-executable instructions, such as program modules, being executed by a hand-held computing device such as a personal desktop assistant. Generally, program modules include routines, programs, objects, components, data structures, and the like that perform particular tasks or implement particular abstract data types. Those skilled in the art will appreciate that the invention may be practiced with other computer systems, including palm-top, desktop or laptop personal computers, mobile devices such as pagers and telephones, multiprocessor systems, microprocessor-based or programmable consumer electronics, network PCs, minicomputers, and mainframe computers. The invention may also be practiced in distributed computing environments where tasks are performed by remote processing devices that are linked through a communications network. In distributed computing environments, program modules may be located in both local and remote memory storage devices.

FIG. 1 shows a general-purpose computing device in the form of a hand-held personal computing device 20. Device 20 includes a processing unit 21, a system memory 22, and a system bus 23 that couples various system components, including the system memory, to the processing unit 21. System bus 23 may be any of several types of bus structure, including a memory bus or memory controller, a peripheral bus, and a local bus using any of a variety of bus architectures. System memory 22 includes read-only memory (ROM) 24 and random access memory (RAM) 25. A basic input/output system (BIOS) 26 stored in ROM 24 contains low-level routines that transfer information between elements within the hand-held computer 20, and that perform start-up operations.

A number of program modules are stored in the ROM 24 and/or RAM 25, including an operating system 28 such as Microsoft Windows CE, application programs 29, other program modules 30, and data 31. A user can enter commands and information into the hand-held computer 20 through input devices such as a touch-sensitive display screen 32 and conventional input-detection circuitry 33. Other input devices may include a microphone 34 connected through a suitable audio interface 35 and a physical (hardware) keyboard, not shown. The output circuitry of the touch-sensitive display 32 is also connected to the system bus 23 via video driving circuitry 37. In addition to the display 32, the device may include other peripheral output devices, such as at least one speaker 38 and printers, not shown.

Other external input or output devices 39, such as a joystick, game pad, satellite dish, or scanner, may be connected to computer 20 through a serial port 40 and serial-port interface 41 coupled to the system bus 23. These and other external devices can also connect through other conventional interfaces, such as a parallel port, game port, or universal serial bus (USB), not shown. Hand-held device 20 may further include slot 42 and interface 43 for a flash-card nonvolatile memory, not shown. Computer 20 can also have a number of hardware buttons, switches, and similar controls 44, coupled to bus 23 via interface 45 to facilitate user operation of device 20. Infrared port 46 and corresponding interface 47 communicate with other peripheral devices, including other computers, printers, and so on. The various components and connections shown are exemplary; other components and means of establishing communications links may be used.

The present invention employs a soft-input-panel architecture designed to enable character, key-based and other user data input via the touch screen 32 of the device 20 rather than through a physical keyboard. Two designated areas 32A, 32B accept characters printed with a stylus 32C or finger pressure for recognition according to the invention. To simplify the logic for separating successive characters, a user enters a character in box 32A, then another character in 32B, then in 32A, etc. More boxes may be provided, and other conventional methods of segmenting successive characters may be used instead. Detector 33 provides two streams of timed output samples representing the horizontal and vertical coordinates of stylus 32C on the surface of touchpad 32. It also provides a conventional binary-valued signal indicating whether or not pressure is being applied to the touchpad display 32.

The Invention

Figure 2A:
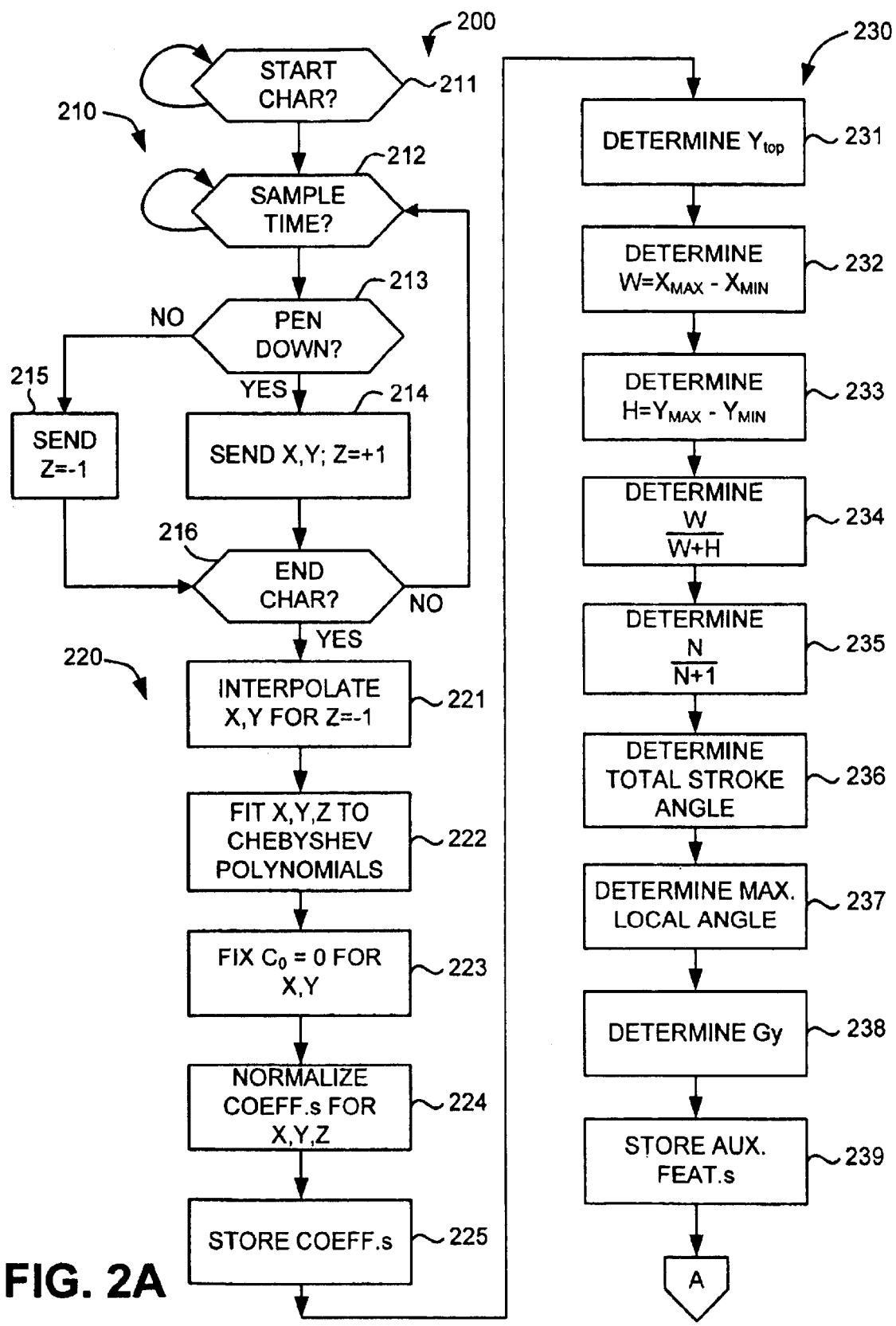
FIGS. 2A–2C, is a flowchart of a method for recognizing alphanumeric characters using feature extraction according to the invention.
Figure 2B:
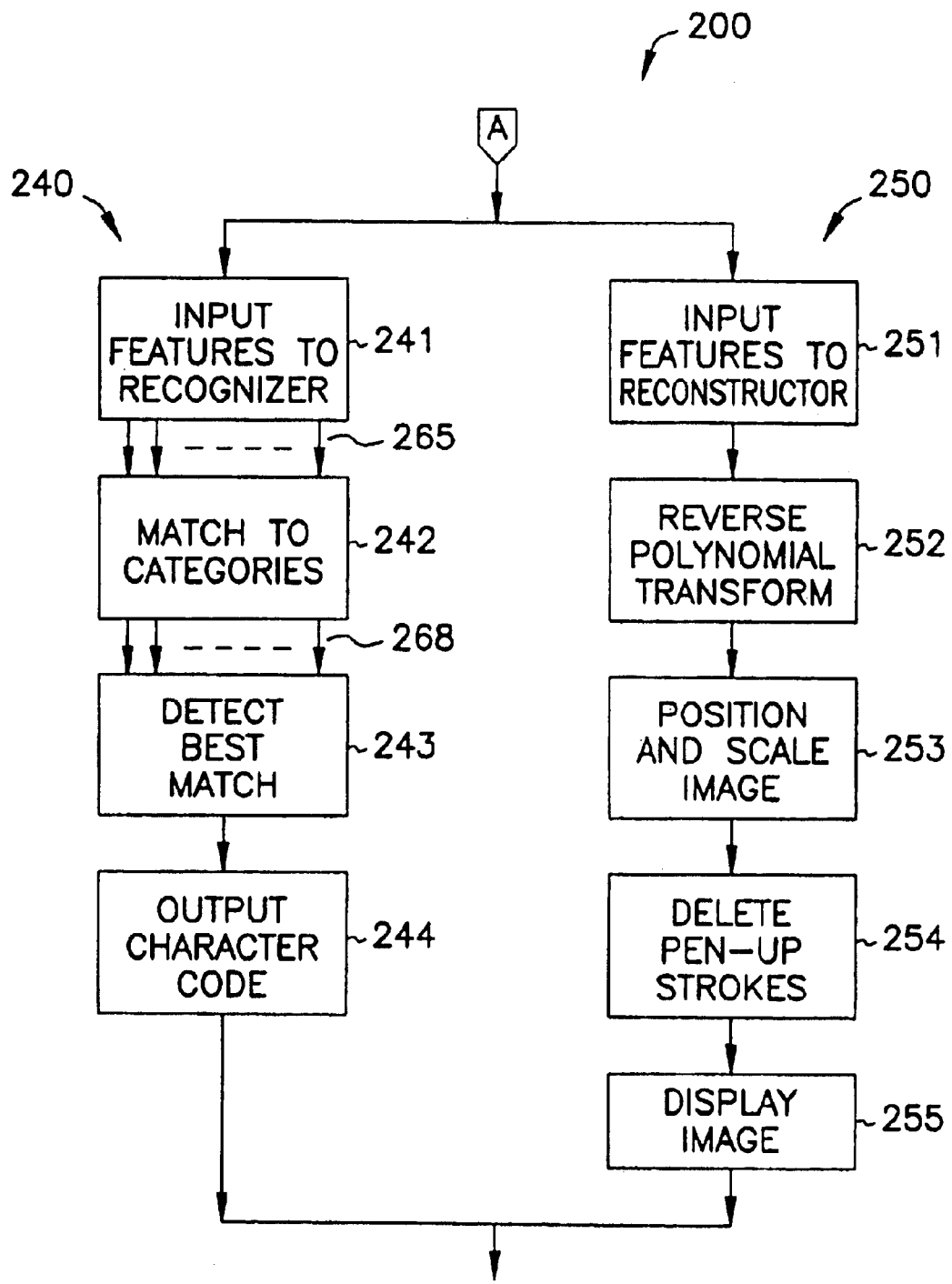

FIG. 2 is a flowchart 200 of a method for recognizing a handprint character drawn by a user on an input device such as a touch-sensitive display screen or touchpad 32 of personal computer 20, FIG. 1. The term "alphanumeric" includes patterns such as punctuation and dingbats, as well as syllabic, ideographic, or other symbols. As mentioned above, a user may enter hand-printed characters in any conventional or stylized alphabet in areas 32A and 32B. Touch pad 32 produces a conventional "pen-down" signal whenever a stylus 32C or finger pressure exceeds a predetermined threshold; for convenience, this binary-valued signal has a value +1 when a character stroke is being drawn, and a value −1 at all other times. Conventional pads or screens 32 output two streams of timed digital samples indicating the horizontal (X) and vertical (Y) coordinates where the pressure is being applied. Also, when small areas 32A, 32B are being employed for character input in a larger touch-sensitive screen are employed for character input, screen input detector 33 detects which of the two areas is currently in use, and translates the X, Y coordinate values to a common, standard set of values for both boxes. For example, suppose that the upper left corners of areas 32A and 32B are X=400, Y=350 and X=500, Y=350 respectively in the overall coordinate system of touchpad 32, and that their lower right corners are X=500, Y=450 and X=600, Y=450. When recognition routine 200 is running, screen input detector 33 translates and scales the coordinates so that the upper left corner of both boxes is X=−1, Y=−1, and the lower right corner of both becomes X=1, Y=1. A signal denoting whether the original X was in the range {400, 499} or in the range {500, 599} is passed to recognition routine 200 to indicate which area is the current area, if required for segmentation or other purposes.

Steps 210 input one character as a single line, trace, or curve from beginning to end, as it is produced. Step 211 signals the start of the character. When a user draws characters on a touchpad such as 32, FIG. 1, the initial pen-down signal in the current box satisfies this step. Other types of input device employ other signals indicating the start of a new character; alternatively, conventional segmentation techniques separate characters by detecting any of a number of physical conditions or by analyzing certain aspects of the input pattern itself. Step 212 divides the character curve into a number of sampled points. Although there are many ways to determine where samples are taken, step 212 takes samples at predetermined fixed time intervals. Step 213 detects the pen-down signal at each sample point. If the state of the pen-down signal indicates that pressure is currently applied to the pad, then step 214 produces X and Y signals indicating the horizontal and vertical coordinates of the stylus position. In addition, the pen-down signal itself serves as an up/down or Z coordinate. That is, step 214 also produces a Z=+1 coordinate signal when pressure is being applied during a stroke of the input character which is perceptible to the user.

When the stylus is lifted during character input, step 215 uses the pen-up signal to produce a Z=−1 up/down coordinate signal at the sample point. That is, steps 210 also treat the character portions that are not perceptible to the user as parts of the input pattern. Because most touchpads produce no X,Y coordinate signals (or invalid signal values) when no pressure is applied, step 215 produces indeterminate X,Y coordinate data for that sample point during character input. Alternatively, step 215 could generate dummy data or a special value indicating that the X,Y position is unknown. If step 216 does not detect the end of a character at the current sample point, control returns to step 212 to await the next sample time. Step 216 may employ any of a number of conventional techniques for detecting the end of a character. In touchpad 32, the user writes sequential characters on alternate ones of the surfaces 32A and 32B. Therefore, a pen-down signal from one surface following a pen-up from the other indicates the end of a character. Again, a number of conventional segmentation methods are available to the art. When the input character has been completely entered, it exists in the memory of computer 20 as three groups of numbers: a first group containing the X-coordinate values at all the sample points, a second group containing the Y-coordinate values at the same sample points, and a third group containing a series of −1 and +1 values indicating whether the pen was up or down at each of the sample points.

Steps 220 transform each group of the sample-point coordinate values separately into coefficients of a set of basis functions. R. W. Hamming, NUMERICAL METHODS FOR SCIENTISTS AND ENGINEERS (McGraw Hill, 1962), is an early and authoritative treatise on the representation of empirical data in mathematical form. Hamming lists a number of sets of functions widely used for this purpose, including polynomial, trigonometric, exponential, and rational functions (p. 81). The polynomial functions, $P(x)=a_0+a_1x+a_2x^2+\ldots$, are advantageous in that they are closed under both translation and scale changes. That is, if $P(x)$ is a polynomial of degree n and k is a constant, then $P(x+k)$ and $P(kx)$ are also polynomials of degree n, although, of course, the coefficients of the various terms will change. These properties simplify applications where there is no natural origin or scale. That is, a printed "A" remains an "A" regardless where it is written on a page, and regardless how large or small it is. One set of basis functions in use for more than a century comprises the Chebyshev polynomials, discussed by Hamming on pp. 249–264, and at greater length in L. Fox and I. B. Parker, CHEBYSHEV POLYNOMIALS IN NUMERICAL ANALYSIS (Oxford University Press, 1968). Besides the advantages shared by other polynomial functions, Chebyshev polynomials can be calculated easily, are orthogonal to each other, and have desirable error properties. These advantages achieve uniform data representation and good data reduction. However, other well-known basis or approximation functions, such as Legendre polynomials, rational functions, or even Fourier series, could be employed instead.

Table 310, FIG. 3, illustrates raw sample points from an input character. Each sample point corresponds to a table row. The X, Y, and Z columns correspond respectively to the groups of values for the X, Y, and Z coordinates of the character at those sample points. The sample point in row 311, for example, has coordinate values X=0.139, Y=0.878, and Z=+1. Thus, table 310 presents a record of the entire current character from beginning to end as three groups of coordinate values representing a single collection of sample points, regardless of the number of perceptible strokes in a visual image of the character. The strokes appear only as transitions between different values of the Z column; and, unlike conventional recognition, pen-up intervals also qualify as parts of the character. As shown in the Z column, the up/down Z coordinate has only two possible values: Z=−1 for a pen-down condition, and Z=−1 for pen-up. In all rows where Z=−1, the X and Y coordinates have dummy values, when they are not available from the input device. Specific values and ranges of all the coordinates are of course arbitrary, although the use of symmetrical Z values eases the computation somewhat in the present embodiment.

In the absence of actual X,Y values during pen-up, step 221 supplies synthetic ones. In this embodiment, step 221 linearly interpolates them from the X,Y values of the adjacent pen-down strokes. In table 310, for example, the X values for second-stroke rows 312 are interpolated over the range from 0.138 to 0.512, the last value of X for the left-hand pen-down character stroke to the first value for the right-hand pen-down stroke. The method of generating these values is not critical. Quadratic or other forms of interpolation might be appropriate; in some cases, they might not need to be produced at all. Other cases might require step 221 to translate or normalize the raw values in table 310, or to perform other preliminary manipulations.

Step 222 fits the entire string of values of each of the three coordinates to a separate Chebyshev polynomial. Many standard references describe Chebyshev polynomials and their use in approximating strings of data values. W. H. Press, et al., NUMERICAL RECIPES IN C (Cambridge University Press, 2d Ed., 1992), for example, contains both expositions and computer-implemented routines for generating the polynomials and for fitting them to experimental data.

Briefly, a Chebyshev polynomial of the first kind T (from the French spelling "Tchebycheff") of degree n in the variable x is defined as $$T_n(x)=\cos(n \arccos x)$$

for x in the interval $\{-1,+1\}$. Trigonometric identities reveal that these are indeed polynomials in x.

$$T_0(x)=1$$

$$T_1(x)=x$$

$$T_2(x)=2x^2-1$$

$$\ldots$$

The higher polynomials can be calculated from a three-term recurrence relationship $$T_{n+1}(x)=2xT_n(x)-T_{n-1}(x)$$

An arbitrary function can be expressed as a sum of such polynomials, each multiplied by a constant coefficient $c_n$:

$$f(x)=c_0T_0(x)+c_1T_1(x)+c_2T_2(x)+\ldots$$

Although the nature of Chebyshev polynomials limits the range of x to $\{-1,+1\}$, a simple affine transformation can, of course, reduce any variable to this range. Although an exact representation of $f(x)$ requires an infinite series, the function can be approximated by truncating the sum at a certain term $c_kT_k$. In the present environment, as in most others, the magnitude of the higher coefficients decreases rapidly. Thus the magnitude of $c_k$ dominates the total truncation error. Moreover, a representation of $f(x)$ by a finite number of inexact values at spaced points reduces the need for accuracy beyond a certain amount. Chebyshev polynomials have several felicitous properties in this regard: the absolute error at any point is bounded, the error spreads smoothly over the entire interval of the function, and the maximum error is almost as small as that of the optimal—but difficult to calculate—minimax polynomial. In addition, Chebyshev polynomials are all orthogonal to each other; that is, the sum (or integral) over all possible values of the variable of the product of any two different Chebyshev polynomials is always zero.

For the present embodiment, a good compromise between calculation time and accuracy calls for the calculation of ten Chebyshev coefficients $\{c_{X0}, \ldots c_{X9}\}$ of polynomials for the horizontal X coordinate, ten coefficients $\{c_{Y0}, \ldots c_{Y9}\}$ for the vertical Y polynomials, and eight $\{c_{Z0}, \ldots C_{Z7}\}$ for the bi-valued up/down Z coordinate.

Fitting any function to a string of data points requires an error criterion to evaluate when the best fit has been achieved. This embodiment uses the well-known unweighted least-squares criterion; that is, the coefficient calculation minimizes the sum of the squares of the differences between the sample points of the data and the values of the corresponding Chebyshev polynomial at those points, and assigns equal importance to all data points. As is discussed in many texts on the subject of numerical analysis, one finds a least-squares fit to a polynomial such as $T_n(x) = c_0 + c_1 x + \ldots + c_n x^n$ by treating the coefficients as variables and the (or some of the) sample points $\{t_0, t_1, \ldots t_n\}$ as constant coefficients in a set of equations involving the squared errors at those sample points. Differentiating these equations with respect to the $c_i$ variables produces a set of linear "normal equations" of the form c=Dt, which can then be solved to produce a specific value for each $c_i$, in the vector c. Among the more widely used conventional techniques for solving such equations are the Gauss elimination method and especially the iterative Gauss-Seidel method discussed in the cited Hamming reference and in many standard works on linear algebra. The orthogonality property of the Chebyshev polynomials, however, greatly eases the solution of these equations, because the coefficient determinant D is diagonal; that is, $d_{ij}=0$ except where i=j for any orthogonal set of basis functions. Although least-squares methodology produces excellent results, other conventional goodness-of-fit criteria, such as exact fit at data points or bounded maximum error, might be preferred in some cases.

FIG. 3 represents the group of calculated coefficients as a table 320. Each column contains Chebyshev-polynomial coefficients for one of the coordinates; for example, column 321 contains the values of $c_{X0}$ through $c_{X9}$ for the X coordinate. To accommodate recognition of more complicated characters such as kanji, table 320 may have additional rows for more coefficients; to employ the same table for simpler fonts, some of the rows may be merely filled with zeros for those higher-order coefficients which need not be calculated.

Step 223 sets the coefficients $c_{X0}$ and $c_{Y0}$ to zero. This merely shifts the effective character position to provide location independence; the X and Y polynomials no longer depend upon where the character was written on the input tablet. Coefficients of the Z function are left unshifted, however, so that the endpoint locations of each stroke of the character always occur when the value of the function passes through zero. The reason is to allow reconstruction of the character strokes from the features; if this is not important, $c_{Z0}$ can also be set to zero. Step 224 normalizes the coefficient magnitudes, effectively making all characters the same overall size. This step calculates the root-mean-square (RMS) of a subset of coefficients, and divides each of those coefficients by the RMS amount. The X and Y polynomials are normalized together to preserve the aspect ratio (the ratio of width to height) of the character; the Z polynomial is normalized by itself. For example, the normalized value of $c_{X1}$ is its old value multiplied by $\frac{1}{18}$ times the square root of the sum of the squares of $c_{X1}$ through $c_{X9}$ and $c_{Y1}$, through $c_{Y9}$. The normalized value of $c_{Z1}$, on the other hand, is its old value multiplied by $\frac{1}{8}$ times the square root of the sum of the squares of $c_{Z1}$ through $c_{Z7}$. Therefore, steps 223 and 224 standardize the location and size of the input character, so that the recognition unit need not compensate for them.

Step 225 stores the converted coefficient values in table 320 for use by a recognition unit. Because $c_{X0}$ and $c_{Y0}$ are now always zero, they need not be stored, and the total number of features is twenty-six: nine each for X and Y, and eight for the Z coordinate.

Although table 320 contains enough features to permit recognition of the input characters, the extraction of certain additional features aids recognition, and also provides capabilities for performing other operations upon a character or other input pattern. Steps 230 derive these further features from the raw input-pattern values in table 310, FIG. 3.

Step 231 retrieves $Y_{top}$, the maximum value of the vertical coordinate values in the Y column of table 310. Step 232 calculates $W=x_{max}-X_{min}$, the width of the input character, while step 233 finds the character height, $H=y_{max}-y_{min}$. These features primarily aid in reconstructing the character image.

Step 234 calculates a quantity R=W/(W+H) related to the aspect ratio of the character. The use of this function rather than the actual aspect ratio W/H avoids very large and very small numeric values for thin characters. Step 235 returns a quantity related to the number of strokes N in the character. Counting the number of transitions or steps in the Z column of table 310 produces this number. Again, in order to reduce the numeric range of this feature, the quantity actually calculated is N/(N+1).

Step 236 traverses the entire trace of the character, including the pen-up strokes. This step then calculates the total angle $A_{total}$ of the character, the angle through which the stylus rotates in tracing out the entire character. Step 237 finds the maximum local angle $A_{max}$ in any pen-down stroke; the local angle is the amount of stylus rotation between any two successive data points.

Step 238 finds the center of gravity $G_y=(y_0+y_1 \ldots +y_K)/K$ for all the K values of the Y coordinate in table 310. This feature measures the height at which most of the character occurs, and has been found to be useful in recognition.

The eight features generated in steps 230 have been found to be relatively independent of each other for input characters over a wide range of handprint fonts. Step 239 stores the values of these additional features in table 320, which now contains a total of thirty-four features.

Steps 240 identify the input character by transforming the 34 feature values into one of 94 character classes. The classes can represent different output classes, such as "A", "b", "#"; sometimes, however, it is useful to represent widely differing forms of the same class, such as "a" and "a", separately, and then combine them into the same output code later. Step 241 inputs the table 320 of features to a recognition unit as signals or codes denoting the magnitudes of the 26 coefficients of the X, Y, and Z Chebeshev polynomials and the magnitudes of the eight additional features determined in steps 230. Step 242 matches this set of magnitudes to the number of different categories. Although any hardware or software recognition unit may be employed, this embodiment uses a conventional analog neural network having three layers of neurons having weighted interconnections among and between the layers. As in standard practice, the network is trained on large numbers of input samples by weighting the interconnections. This approach works well for both simple fonts such as Roman characters and more complicated character sets such as cursive katakana. Indeed, the so-called simpler fonts are sometimes deceptively complicated; a capital "E", for example, may have seven to ten strokes. Step 243 detects which of the 94 output neurons has the highest output. Step 244 converts the identity of that neuron to a character code identifying the input character. As is usual in many types of recognition unit, more than one neuron may code for the same character class.

The features extracted in steps 220 and 230 are also useful in reconstructing an image of the input character or other pattern, as shown in steps 250. An image may be desirable for a number of purposes, such as handwriting authentication, human analysis of rejects or substitutions, and training adaptive recognition circuits or software, after having discarded the original data. Step 251 inputs the feature table 320 to a reconstruction unit. Step 252 reconstructs the normalized positions of the original curve by inverting the X, Y, and Z polynomials. Standard formulas exist for uniquely reconstructing a function from its Chebyshev representation. Step 253 positions and scales the reconstructed ink in the X and Y coordinates using the auxiliary features developed in steps 230, and particularly in steps 231 through 234. Step 254 employs the reconstructed Z-coordinate function to delete pen-up strokes from the image. The preservation of the original step-locations in the Z Chebyshev polynomial, as mentioned above, ensures that the ends of all strokes remain fixed; errors in the magnitude of the reconstructed Z function are immaterial, because only its sign determines whether a stroke appears or not. (In some cases, such as for training the recognizer, it may be desirable to omit step 254.) Finally, step 255 outputs the reconstructed image. Displaying it may be appropriate, or storing it in memory, or performing some other operation.

Figure 2C:
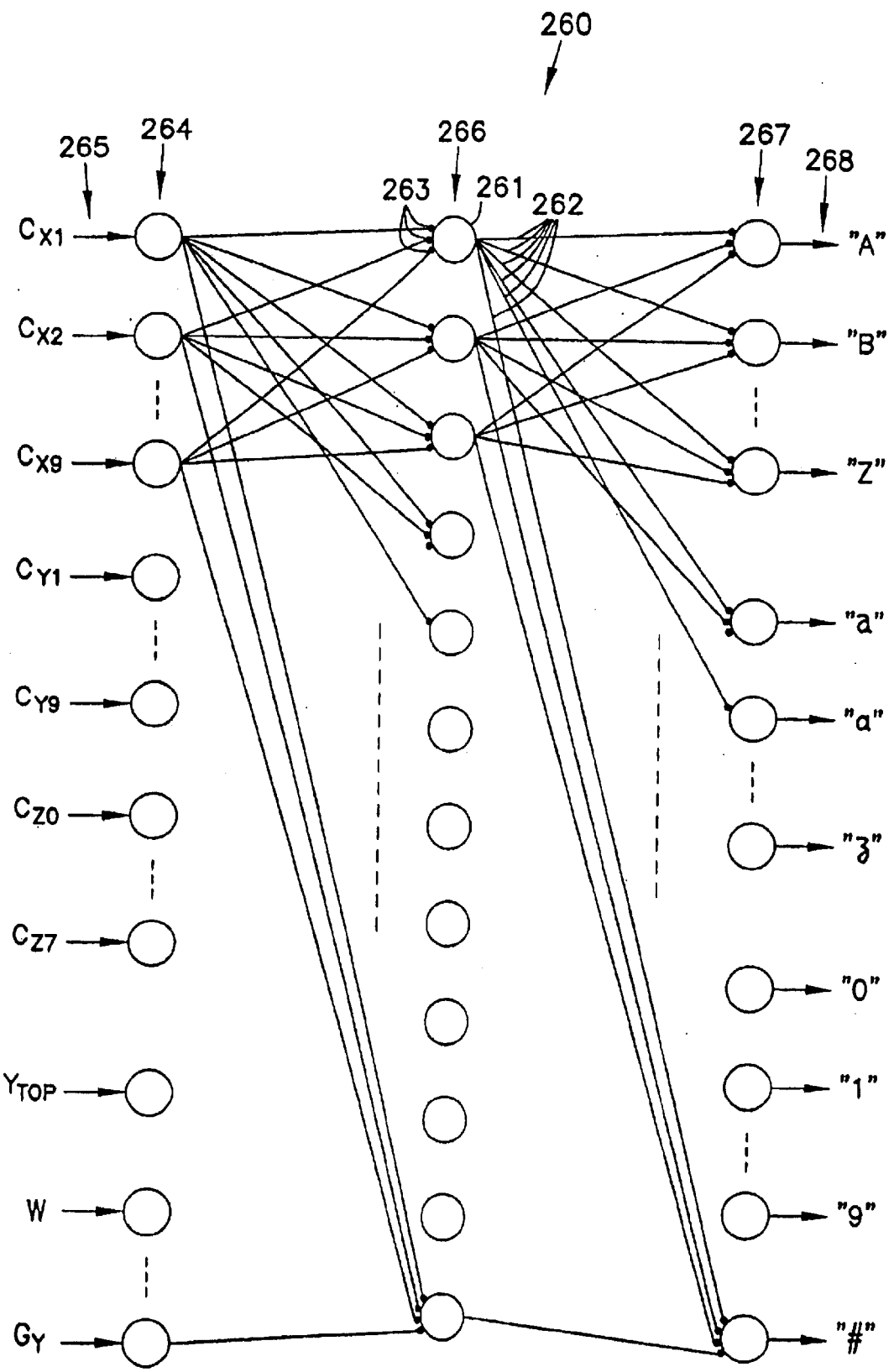

FIG. 2C illustrates a form 260 of neural net which can be employed in step 242 to assign different combinations of input features to output character classes. A number of standard references describe neural networks suitable for inclusion in the present system. P. Mehra, et al., ARTIFICIAL NEURAL NETWORKS: CONCEPTS AND THEORY (IEEE Computer Society Press, 1992) presents a tutorial exposition covering the past few decades. A. S. Pandya and R. B. MacY, "PATTERN RECOGNITION WITH NEURAL NETWORKS IN C++ (CRC Press, 1995) describes a number of software simulations of neural networks designed specifically for the present application. Basically, an artificial neuron such as 261 mimics a biological neuron by producing an output signal on all its axons 262 which is a weighted function of multiple input signals arriving at its synapses 263. For example, the output signal of neuron 261 could represent 0.749 times the input signal at a first synapse, plus ) 0.053 times the signal at a second synapse, minus 0.342 times the signal at a third, etc., then hard clipped to the range {-1,+1}. That is, this particular neuron responds strongly to its first input, weakly to the second, and is actually inhibited (i.e., its output signal is reduced) by the third. Some networks employ neurons having activation functions other than adding together their weighted inputs.

Most neural networks have three layers of neurons. An input layer 264 receives the feature signals on lines 265 and distributes them as input signals of all neurons in a hidden layer 266. Multiple middle layers can be added if desired, although a single layer suffices in many cases. The example net 260 is a feedforward network; more complex networks can return the outputs of some neurons back into neurons of the same or preceding layers. The output signals of layer 266 are distributed as input signals of all neurons of an output layer 267. The output signals 268 from this layer are the likelihood that the input character represents an "A", a "B", or any of the other predefined character classes. That is, network output lines 268 usually do not signal that the input character is an "A" and that it cannot be anything else, but rather that the probability it is an "A" is 0.956, the probability it is a "B" is 0.011, all the way down to a probability 0.030 that it represents the octothorpe on the lowermost output line. Step 243, FIG. 2B, then decides that the probability of the identity "A" is sufficiently high (and perhaps also sufficiently higher than that of any of the other classes), that the digital code for "A" should be produced. Some neural networks include internal thresholders in some or all of the neurons, so that their outputs 268 are binary yes/no signals rather than many-valued probability signals; in that case, only the "A" output signal will indicate a match, and all the others will indicate lack of a match.

The weights of the synapses in a neural net 260 are determined by training the network on a large number of sample characters in a supervised training mode. For example, a trainer can increase the weights of synapses in a path through the network which leads from a particular set of feature values to a correct identification of the character which happened to produce those feature values. Over a period of time, the network comes to associate certain combinations of feature values with certain characters. Numerous computer-implemented training routines are available in the art. Although training usually ceases and the weights are fixed before the network is installed in a recognition device, even relatively simple neural networks seem in many cases to extend their training to new input patterns in what their human designers consider to be natural ways.

Figure 4C:
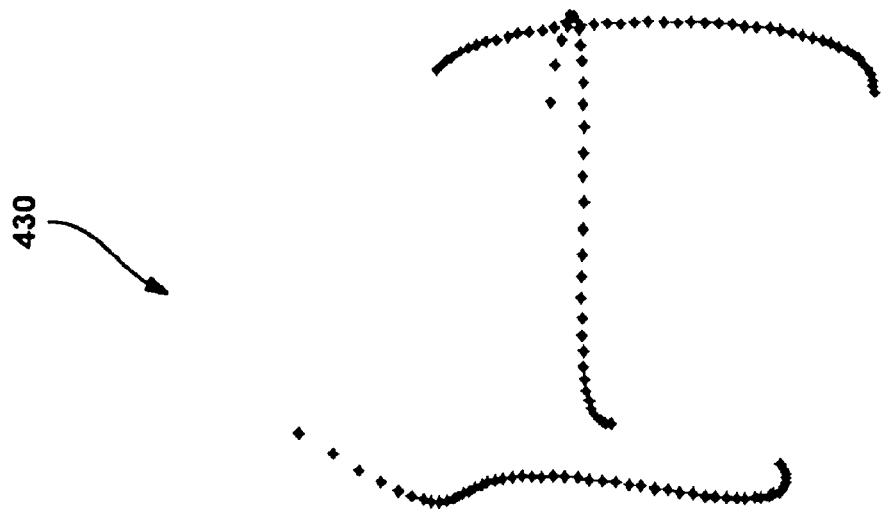
FIGS. 4A–4C, is a representation of a character analyzed according to the invention.
Figure 4B:
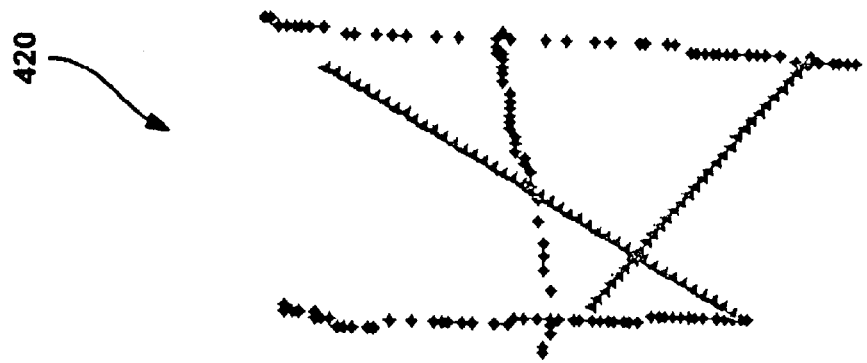
Figure 4A:
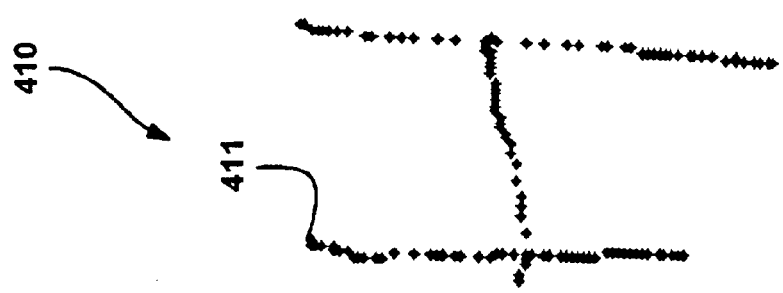

FIG. 4 illustrates a typical character processed according to the invention. FIG. 4A is a handprinted capital "H" 410 as it appears on input device 32, FIG. 1, with the sampled data points shown enlarged as at 411. FIG. 4B shows the same input pattern 420 with interpolated sample points for the pen-up strokes. The X, Y, and Z Chebyshev-polynomial coefficients for pattern 420 are those shown in table 320, FIG. 3. FIG. 4C shows the input character 430 as reconstructed from the features used for recognition.

Figure 5:
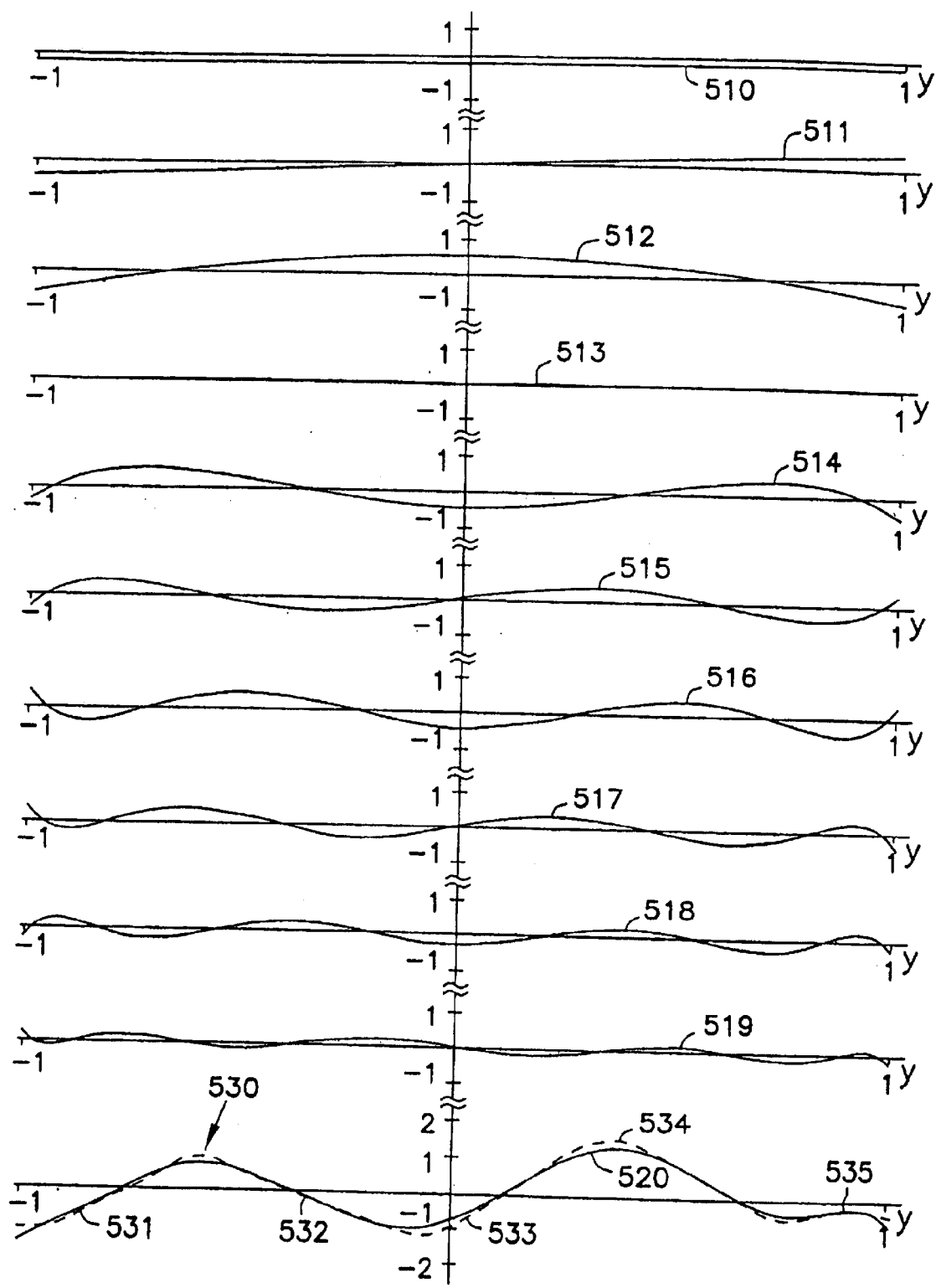
FIG. 5 shows the analysis of a character coordinate by means of Chebyshev functions according to the invention.

FIG. 5 shows graphs 500 illustrating the approximation of the Y coordinate function of character 410 by means of Chebyshev polynomials. Graph 510 shows $T_0(y)$, which is simply the constant value 1.0, multiplied by its coefficient −0.223648 from the Y column of table 320. Graph 511 represents $a_{1Y}T_1(y) = +0.397675y$. Graphs 512–519 similarly represent $a_{2Y}T_2(y)$ through $a_{9Y}T_9(y)$ for the coefficients in the Y column of table 320. Graph 520 shows the sum of all the graphs 510–519 above it in FIG. 5. Dashed graph 530 is the actual path of the stylus in the Y direction while drawing the character 420, FIG. 4B. Because the lowest Y values are at the top in FIG. 4B, graph 530 first increases at 531 as the stylus draws the left-hand vertical stroke 421; the straight decreasing portion 532 represents the interpolated sample points in the pen-up portion 422 as the stylus travels from the lower part of the left-hand stroke to the top of the next stroke. Portion 533 is the downward trace 423 of the right-hand vertical stroke, and straight-line portion 534 interpolates the pen-up line 424 from the bottom of the right-hand stoke to the left-hand side of the horizontal crossbar. Finally, graph portion 535 represents the very small upward slope of the horizontal crossbar 425 in FIG. 4B. The small differences between the actual Y graph and the approximating Chebyshev graph 520 can be seen in FIG. 4C, where character 430 is a reconstruction of character 410 using the Chebyshev polynomials, including graph 520. The pen-up strokes have been removed in FIG. 4C by blanking the character trace wherever the approximating graph for the Z direction (not shown) is less than zero.

Having described an implementation of my invention, as well as some of the variations that will occur to those skilled in the art, I claim:

1. A computer-implemented method comprising:
   recording coordinate values representing a two-dimensional pattern as a three-dimensional pattern, including storing x-coordinate and y-coordinate values in conjunction with a z-coordinate, the z-coordinate having a first value at times when the pattern is being entered and a second value at times when the pattern is not being entered;
   fitting the x-coordinate, y-coordinate and z-coordinate values at sample points to a plurality of related mathematical basis functions by transforming the coordinate values at the sample points into coefficients of the function;
   featurizing the input pattern into a plurality of features, at least some of the features corresponding to the coefficients of the basis function; and
   performing computerized recognition by using the features to determine an alphanumeric value corresponding to the input pattern.

2. The method of claim 1 wherein the plurality of related mathematical basis functions comprises a polynomial.

3. The method of claim 1 wherein the plurality of related mathematical basis functions comprises a Chebyshev polynomial.

4. The method of claim 1 wherein recording coordinate values comprises, receiving x-coordinate and y-coordinate values representing strokes entered into an input device, and storing the x-coordinate and y-coordinate values in conjunction with the first value of the z-coordinate as the strokes are received.

5. The method of claim 1 wherein the computerized recognition is performed in real time.

6. The method of claim 1 wherein featurizing the input pattern further comprises, deriving other features from the input pattern in addition to the coefficient-based features.

7. The method of claim 1 further comprising, detecting an end to the entry of a set of strokes before performing computerized recognition on that set.

8. The method of claim 1 further comprising, normalizing at least some of the features.

9. A computer-readable medium having computer-executable instructions for performing the method of claim 1.

10. A method for recognizing an input pattern, comprising:
    sampling the input pattern so as to produce a plurality of groups of coordinate values, each of the groups including an up/down coordinate such that the plurality of groups represent the input pattern as a single curve independent of a number of strokes that formed the pattern;
    transforming the groups of coordinate values into coefficients of a plurality of related mathematical basis functions; and
    providing the coefficients as features to a feature-based recognizer, the recognizer using the features to return information that identifies the entire input pattern as belonging to one class of a set of possible classes.

11. The method of claim 10 wherein the plurality of related mathematical basis functions comprises a polynomial.

12. The method of claim 10 wherein the plurality of related mathematical basis functions comprises a Chebyshev polynomial.

13. The method of claim 10 wherein transforming the groups of coordinate values comprises, normalizing the coefficients to compensate for characteristics of the input pattern.

14. The method of claim 10 wherein transforming the groups of coordinate values comprises, fitting the coefficients to the functions in accordance with an error criterion.

15. The method of claim 10 wherein transforming the groups of coordinate values comprises, fitting the coefficients to the functions in accordance with a least-squares criterion.

16. The method of claim 10 wherein the computerized recognition is performed in real time.

17. The method of claim 10 further comprising, providing other features of the input pattern in addition to the coefficient-based features to the feature-based recognizer.

18. A computer-readable medium having computer-executable instructions for performing the method of claim 10.

19. A method for recognizing a two-dimensional input pattern corresponding to a plurality of separate pattern strokes, each stroke being entered during a pen-down condition that occurs between pen-up conditions, the method comprising:
    converting the input pattern into a single curve independent of pattern strokes by sampling the input pattern into a single set of a plurality of x-coordinate, y-coordinate and z-coordinate values, the z-coordinates having a first value corresponding to a pen-down condition or a second value corresponding to a pen-up condition;
    transforming the x-coordinate, y-coordinate and z-coordinate values into coefficients of a plurality of related mathematical basis functions;
    maintaining the coefficients, including those for the values representing the z-coordinate, as features of the input pattern; and
    identifying the entire input pattern as belonging to one of a number of classes based on the features.

20. The method of claim 19 wherein the plurality of related mathematical basis function comprises a polynomial.

21. The method of claim 19 wherein the plurality of related mathematical basis functions comprises a Chebyshev polynomial.

22. The method of claim 19 wherein transforming the x-coordinate, y-coordinate and z-coordinate values into coefficients comprises, normalizing the coefficients to compensate for characteristics of the input pattern.

23. The method of claim 19 wherein transforming the x-coordinate, y-coordinate and z-coordinate values comprises, fitting the coefficients to the functions in accordance with an error criterion.

24. The method of claim 19 wherein transforming the x-coordinate, y-coordinate and z-coordinate values comprises, fitting the coefficients to the functions in accordance with a least-squares criterion.

25. The method of claim 19 wherein the computerized recognition is performed in real time.

26. The method of claim 19 further comprising, maintaining other features of the input pattern in addition to the coefficient-based features.

27. A computer-readable medium having computer-executable instructions for performing the method of claim 19.

28. A system for recognizing an input pattern, comprising:
- an input device for producing a plurality of signals corresponding to coordinates of the input pattern on the input device, at least one of the signals identifying an up/down state of input, the coordinates representing the input pattern as a single curve independent of a number of pattern strokes that form the input pattern;
- a data processor for transforming the signals into coefficients of related basis functions; and
- a recognition unit responsive to the coefficients for identifying the input pattern as belonging to one of a number of classes.

29. The system of claim 28 wherein the input device comprises a pressure sensitive device that produces signals representing x-coordinates and y-coordinates when pressure is sensed thereby.

30. The system of claim 28 wherein the input device comprises a pressure sensitive device that produces at least one signal when pressure is sensed thereby and at least one other signal when pressure is not sensed thereby.

31. The system of claim 28 wherein recognition unit comprises a neural network.

32. A computer-readable medium having computer-executable instructions, which when executed perform a method, comprising:
- sampling an input pattern comprising a plurality of distinct strokes, so as to produce a plurality of coordinate values including values representing an up/down coordinate, the plurality of coordinate values representing the input pattern as a single curve independent of how many distinct pattern strokes are in the plurality;
- transforming the coordinate values, including those for the values representing the up/down coordinate, into coefficients of a set of basis functions;
- maintaining the coefficients as features of the input pattern; and
- identifying the input pattern as belonging to one of a number of classes based on the features.

* * * * *

UNITED STATES PATENT AND TRADEMARK OFFICE
CERTIFICATE OF CORRECTION

PATENT NO. : 6,898,315 B2  Page 1 of 1
APPLICATION NO. : 10/104453
DATED : May 24, 2005
INVENTOR(S) : Guha It is certified that error appears in the above-identified patent and that said Letters Patent is hereby corrected as shown below:

In column 12, line 54, in Claim 20, delete "function" and insert -- functions --, therefor.

Signed and Sealed this

Twenty-second Day of September, 2009

David J. Kappos
*Director of the United States Patent and Trademark Office*